Figure 1:
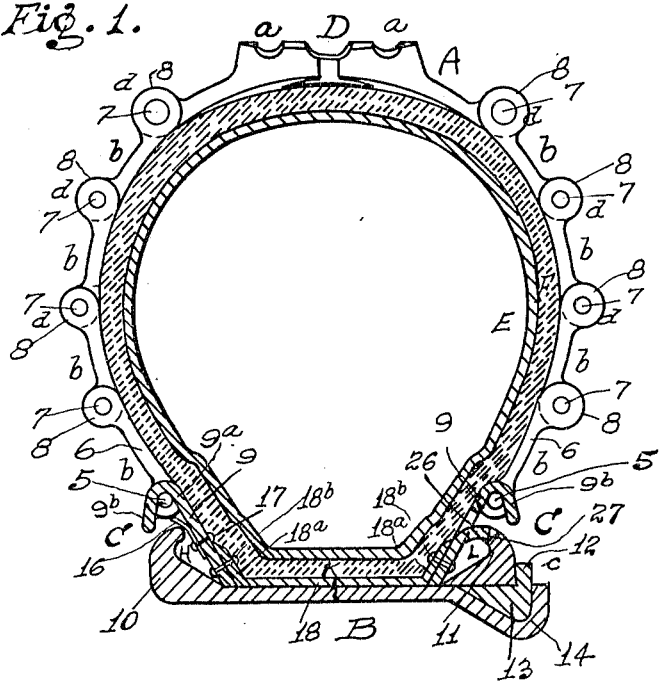

A. W. SAVAGE.
VEHICLE TIRE.
APPLICATION FILED MAY 15, 1912.

1,090,169.

Patented Mar. 17, 1914.
2 SHEETS—SHEET 1.

Witnesses:
W. F. Heermann
J. A. Schelnik

Inventor:
Arthur W. Savage;
By Raymond Ives Blakeslee,
his Attorney

A. W. SAVAGE.
VEHICLE TIRE.
APPLICATION FILED MAY 15, 1912.
1,090,169.
Patented Mar. 17, 1914.
2 SHEETS—SHEET 2.
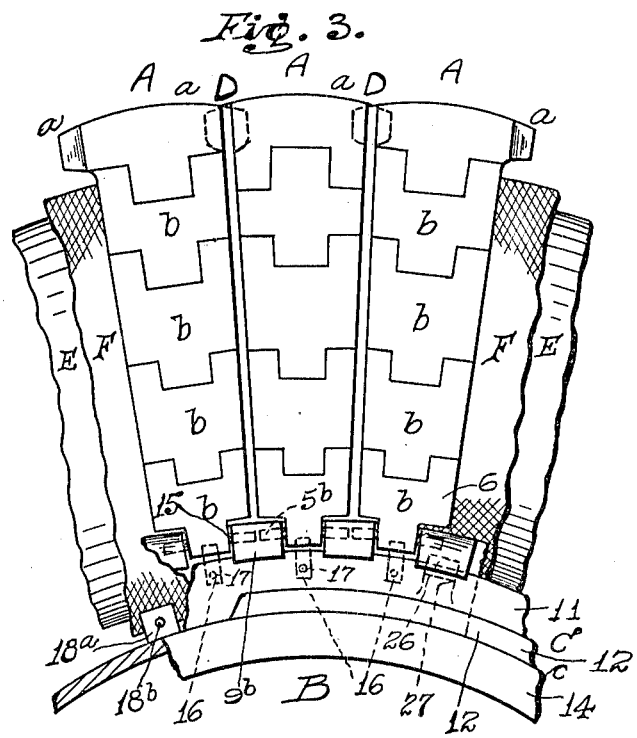
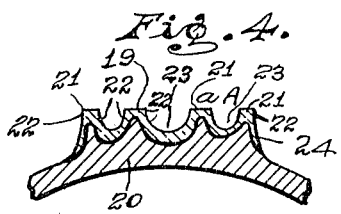
Witnesses:
W. F. Seeman
J. A. Schelnik
Inventor:
Arthur W. Savage;
By Raymond Ives Blakeslee,
his Attorney.

UNITED STATES PATENT OFFICE.

ARTHUR W. SAVAGE, OF DUARTE, CALIFORNIA.

VEHICLE-TIRE.

1,090,169.   Specification of Letters Patent.   Patented Mar. 17, 1914.

Application filed May 15, 1912. Serial No. 697,465.

*To all whom it may concern:*

Be it known that I, ARTHUR W. SAVAGE, a citizen of the United States, residing at Duarte, in the county of Los Angeles and State of California, have invented new and useful Improvements in Vehicle-Tires, of which the following is a specification.

This invention relates to vehicle tires, and more particularly to tires for automobiles and motor vehicles; and it has for its object to provide an improved vehicle tire which will be superior in point of relative inexpensiveness of construction, durability, length of life, positiveness of tractive engagement with the roadway, adaptability to wheels of standard construction, and facility in assembling and taking apart, which will be approximately devoid of liability to puncture or blow out, which will effectively resist the tendency to skid or slip, and which will be generally superior in efficiency and serviceability.

The practice of the invention contemplates the provision and utilization of features of general construction and organization which are likewise disclosed in my prior applications for Letters Patent, particularly an application filed by me February 13, 1911, Serial No. 608,349, for vehicle tires.

In the main, the invention comprises, inclusive of the general features last referred to, a plurality of articulated sections the ends of which are detachably connected with the wheel or the felly thereof, all of the sections being inter-related and serially united to provide a substantially continuous organization within which or between which and the wheel is inclosed and incased the pneumatic tube which supplies the resilience and cushion for the tire. The present improvements relate particularly to the tread portions of said sections, and to the means whereby the sections are connected with the wheel or the felly thereof and held firmly in place without the obviation of facility in taking apart or disconnecting for substitution or repair.

The invention has for its object to provide improvements of the general nature stated which will be superior in point of relative simplicity and inexpensiveness of construction, organization, formation and assemblage of parts and features, together with durability and general efficiency and serviceability of the same, all as hereinafter described, shown in the drawings and finally pointed out in claim.

Figure 2:
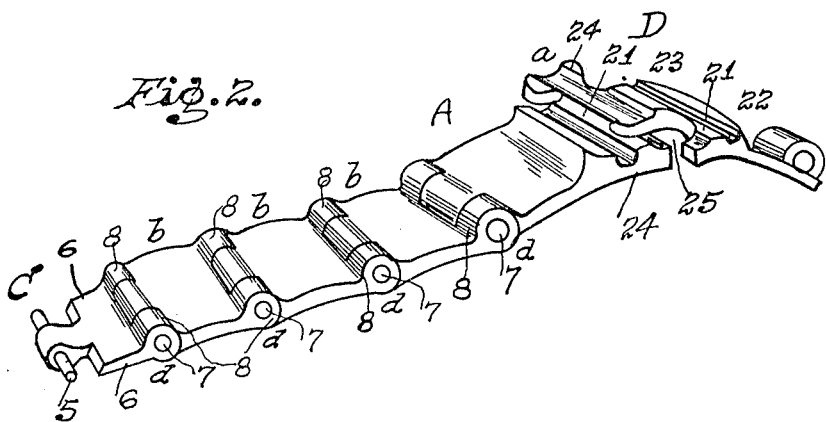

In the drawings: Figure 1 is a transverse sectional view of a tire, and of a portion of a wheel with which the tire is connected, all being organized in accordance with the invention; Fig. 2 is an isometric view of a portion of one of the tire sections in detached position; Fig. 3 is a side elevation, partly fragmentary and partly broken away and partly in section, of the construction shown in Fig. 1; and Fig. 4 is a detail transverse sectional view taken through the tread portion of one of the sections.

Corresponding parts in all the figures are denoted by the same reference characters.

Referring with particularity to the drawing, A designates in each instance, one of the tire sections, B designates the felly of a wheel with which the tire sections are connected by securing means C at both sides of the felly, said securing means being provided with locking means $c$ by which the securing means are held in operative position; and D designates operative connections or interlocking means between the several sections A, through the agency of which the several sections are combined in an approximately continuous tire formation, there being, however, narrow spaces between the adjacent sections, and the interlocking means D permitting play as between and among the several sections A so that the sections may relatively move transversely of the wheel, circumferentially of the wheel, and radially of the wheel, under the varying stresses imparted to the tire in use, to the end that while the pneumatic tube or air tube is effectually protected its cushioning function may have full play and effect and the several sections may accommodate each other during subjection to such stresses so as to flexibly or yieldingly conform to the varying conditions of surface met with, insuring long life and freedom from damage of the tire. From the tread portions $a$, at each side, extend a plurality of sections, parts or links $b$, and the terminal parts $b$ are provided with connection heads 5 joined therewith by narrow necks 6, and formed for engagement with the securing means C. The several sections, part or portions $a$ and $b$ are joined by hinge means $d$, comprising pintles 7 and knuckles 8, the links or parts $b$ being curved longitudinally as are the tread portions $a$, to conform in the main to the transverse curvature of the air tube E between which, or among which and the felly B and the sections is interposed a flexible, preferably textile, sheath F. The securing means C comprising annuli 9 at the opposite sides of the felly B, having spaced divergent side portions, $9^a$ and $9^b$, respectively, of unequal width, the wider side portions, $9^a$, resting upon the felly of the wheel, and facing inwardly, and the narrower side portions, $9^b$, facing outwardly, one of the latter being slightly spaced from an annular inwardly curved flange 10 upon one side end of the felly, and the other side portion $9^b$ being slightly spaced from a detachable annulus or hoop 11, of inwardly curved formation and held in position by the locking means $c$ comprising a flange 12 upon a locking wedge 13 abutting against one of the hoops 11 and fitting within a pocket 14 in the felly B at one side thereof. This locking means may be organized in accordance with standard practice, or varied as preferred. The flange 10 and annulus 11 firmly hold the annuli 9 in position upon the felly, the sections being held to said annuli 9 by the connection heads 5 which are accommodated within the spaces between the side portions $9^a$ and $9^b$ of the annuli 9, the necks 6 passing through slots 15 in the crowns of the annuli 9 where the side portions of the same join, such slots extending in a series throughout the annuli.

The connection heads 5 are held up in the spaces between the side portions of the annuli by holding means H consisting of leaf springs 16, preferably one for each section end, such leaf springs being secured each at its inner end, as at 17, in connection with the inner face of the respective side portion $9^a$ and the upper end thereof being bent outwardly to engage with the end of the end link $b$ of the respective section.

The annuli 9 are preferably joined at intervals by connection means K comprising bars 18 independent of the felly B but resting upon the same and having up-turned end portions $18^a$ secured to the inner faces of the annuli side portions $9^a$ as at $18^a$.

The tread portion $a$ of each of the sections A is preferably formed of metal, the surface portion of which, 19, is relatively harder than the body 20 of the same, such surface portion, where so relatively harder, as by case-hardening, and where presented to the roadway, being provided with ribs 21, extending circumferentially of the tire, such ribs having side cutting edges 22. These ribs are separated by circumferential grooves 23, preferably deeper than the region of greater hardness.

The interlocking means or operative connections D between the several sections A comprise heads 24 and recesses 25, one of each formed upon each of the tread portions $a$, each head interlocking in loose fit with the recess upon the next adjacent tread portion.

Means L are provided for preventing relative circumferential movement between the hoop 11 and the flange 10 and the respective annuli 9. These means may consist of projections 26 upon the annuli 9, preferably integral therewith and respectively entering recesses 27 formed in the upper inwardly projecting crowns of the flange 10 and the hoop 11.

The operation, method of use and advantages of the improvements in vehicle tires will be readily understood from the foregoing description taken in connection with the accompanying drawing, and the following statement.

The sections are assembled serially with the interlocking means D joining the several tread portions and play being permitted between and among all the sections, and with the necks 6 in the slots 15 in the annuli 9 and the connection heads 5 held within the spaces between the divergent side portions of the annuli 9. The securing means C are adjusted so that the wedge 13 and its flange 12 hold the hoop 11 firmly against one annulus 9, the other annulus 9 being thus forced against flange 10 upon the felly B, holding the entire tire to the felly, with the pneumatic tube E and sheath F between or among the sections and the felly, the connection bars 18 effectively cross-bracing the annuli 9 and rigidly uniting the construction at both sides of the felly.

The means L, comprising the projections 26 and recesses 27, effectively prevent creeping of the tire circumferentially of the felly. The holding means H comprising the leaf springs 16 are readily manipulated by forcing the upper ends of the springs inwardly, to permit detachment of the ends of the sections from the annuli by slipping the connection heads 5 out of the spaces within the annuli; and in assembling the parts the connection heads and ends of the links may be readily slipped up into position in the annuli past the leaf springs 16 with the necks 6 traversing the slots 15.

The tread portions $a$ act effectively to prevent side skidding of the wheels to which the tires are applied, the cutting edges 22 of the ribs 21 effectively gripping the roadway. This grip is more effective because of the increased hardness of the surface portion of the tread portion in which the ribs 21 are formed. Even when the ribs 21 wear down so that some metal is exposed at the intermediate faces thereof, the side faces will still be of hardened metal forming sharp cutting edges of hard metal presented to the roadway for tractive engagement and anti-skidding holding effect.

The entire tire is durable in organization and effective in action and readily assembled and taken apart, and most of the several particular features of improvement concerned in the present invention are adapted particularly for use in connection with wheels, fellies and rims or tire securing means adjuncts, constructed and organized in accordance with standard practice.

It is manifest that many changes and departures in formation and construction of features and parts, with relation to the specific matter described and disclosed herein, may be made, without departing from the spirit of the invention and the terms of the following claim:—

Having thus described my invention, I claim and desire to secure by Letters Patent:—

A vehicle tire, comprising a plurality of sections, and means for securing each of the sections in connection with the vehicle wheel; said means comprising slotted annuli upon the wheel, said annuli having spaced side portions, and means upon the sections fitting the spaces between the side portions of the annuli; and tension means for holding said means upon the sections in position between the side portions of said first named annuli; said tension means comprising leaf springs, each connected with one of said annuli at a side portion thereof and projecting at its end adjacent to the means with which it co-acts.

In testimony whereof, I have signed my name to this specification in the presence of two subscribing witnesses.

ARTHUR W. SAVAGE.

Witnesses:
 FRED. G. WHITEHEAD,
 HARRY G. LOGAN.

---

Copies of this patent may be obtained for five cents each, by addressing the "Commissioner of Patents, Washington, D. C."